United States Patent
Warner et al.

(10) Patent No.: US 6,627,891 B1
(45) Date of Patent: Sep. 30, 2003

(54) TEMPORAL DOSIMETER AND METHOD

(75) Inventors: Benjamin P. Warner, Los Alamos, NM (US); Thomas A. Lopez, Los Alamos, NM (US)

(73) Assignee: The Regents of the University of California, Los Alamos, NM (US)

(*) Notice: Subject to any disclaimer, the term of this patent is extended or adjusted under 35 U.S.C. 154(b) by 3 days.

(21) Appl. No.: 10/059,470

(22) Filed: Jan. 28, 2002

(51) Int. Cl.⁷ ................................................. G01T 1/11
(52) U.S. Cl. .................. 250/337; 250/484.5; 250/485.1
(58) Field of Search ............................ 250/337, 370.07, 250/484.5, 485.1, 475.2, 428, 432 R (56) References Cited

U.S. PATENT DOCUMENTS

| | | | |
|---|---|---|---|
| 3,612,870 A | * 10/1971 | Brennan ................ 250/473.1 |
| 3,792,277 A | * 2/1974 | Yamashita et al. ......... 250/337 |
| 4,458,154 A | * 7/1984 | Sugita et al. ............ 250/484.3 |
| 4,488,046 A | * 12/1984 | Bernstein ................ 250/474.1 |
| 4,550,420 A | * 10/1985 | Otto et al. ................. 378/171 |
| 4,864,139 A | * 9/1989 | Phillips .................... 250/367 |
| 4,874,951 A | * 10/1989 | Gold et al. .............. 250/472.1 |
| 5,404,364 A | * 4/1995 | Kepros ........................ 372/5 |
| 5,717,733 A | * 2/1998 | Kurbatov et al. ............. 378/71 |
| 6,054,712 A | * 4/2000 | Komardin et al. ..... 250/363.06 |
| 6,103,351 A | 8/2000 | Ram ........................... 428/195 |

OTHER PUBLICATIONS

H. Attix, "Radiation Dosimetry," Academic Press, vol. 11, chapter 15, and vol. III, chapter 28.
M. Erlich, "The Use of Film Badges for Personal Monitoring" by M. Erlich, International Atomic Energy Agency, Vienna, 1962.

* cited by examiner

*Primary Examiner*—Christopher W. Fulton
*Assistant Examiner*—R. Alexander Smith
(74) *Attorney, Agent, or Firm*—Samuel L. Borkowsky (57) ABSTRACT

The invention includes a temporal dosimeter. One dosimeter embodiment includes a housing that is opaque to visible light but transparent to ionizing radiation. The dosimeter also includes a sensor for recording dosages of ionizing radiation, a drive mechanism, a power source, and rotatable shields that work together to produce a compound aperture to unveil different portions of the sensor at different times to ionizing radiation. Another dosimeter embodiment includes a housing, a sensor, a shield with an aperture portion, and a linear actuator drive mechanism coupled to the sensor for moving the sensor past the aperture portion. The sensor turns as it moves past the aperture, tracing a timeline record of exposure to ionizing radiation along a helical path on the sensor.

11 Claims, 8 Drawing Sheets

TEMPORAL DOSIMETER AND METHOD

STATEMENT REGARDING FEDERAL RIGHTS

This invention was made with government support under Contract No. W7405-ENG-36 awarded by the U.S. Department of Energy. The government has certain rights in the invention.

FIELD OF THE INVENTION

The present invention relates generally to dosimetry and more particularly to a temporal dosimeter that records the exposure to dosages of ionizing radiation as a function of time over an extended time period.

BACKGROUND OF THE INVENTION

Individuals working near ionizing radiation must be able to determine their radiation dosage since they risk developing radiation-induced injuries and sickness if exposed to large dosages. Workers who can efficiently detect an already excessive dosage could leave the area and avoid additional exposure, and seek medical attention if necessary. Dosimeters are typically provided to these workers. Dosimeters typically include a sensor enclosed within a protective housing. A measurable chemical and/or physical change is produced in the sensor when it is exposed to a particular radiation dosage. The protective dosimeter housing is generally composed of materials chosen to selectively absorb at least one type of radiation while transmitting other types. An opaque housing, for example, can absorb electromagnetic radiation in the visible region. A thin plastic housing can absorb alpha radiation but transmit beta radiation. A cardboard, aluminum, or thick plastic housing can absorb both alpha and beta radiation, while a lead housing can absorb even more penetrating radiation such as gamma and x-ray radiation.

Some types of dosimeters provide the total dosage. Others provide the dosage of a particular type of radiation. Still others provide both the total dosage and/or a radiation profile of the relative contribution of the various types of radiation to the cumulative, i.e. total, dosage. Some dosimeters may include a meter that provides a numerical value related to a particular dosage. Other dosimeters may include a chemical mixture that interacts with radiation to produce detectable color and/or opacity changes that indicate exposure to a particular dosage.

A wide variety of sensors have been used with dosimeters. Silver-containing sensors are among the most sensitive since silver has a high absorption cross section for many different types of radiation (see "Radiation Dosimetry", vol. II, chapter 15; and Radiation Dosimetry: vol. III, chapter 28, hereby incorporated by reference). Film badges are among the most widely used dosimeters employing silver-containing sensors (see "The Use of Film Badges for Personnel Monitoring" by M. Ehrlich, International Atomic Energy Agency, Vienna, 1962, hereby incorporated by reference). A film badge sensor is generally an emulsion of microscopic silver halide crystals dispersed in gelatin. The emulsion is coated onto a support to form a film. Images are produced on the film after it is exposed to radiation. The images can be in the form of particle tracks and an analysis of the tracks can provide the identity and the energy of the particles that produced the tracks.

A film badge dosimeter may be configured such that one portion of the film records the dosage of one type of radiation while other portions record other types of radiation. Film badges, therefore, provide a record of the cumulative dosage and a radiation profile for the cumulative dosage. The images recorded by a film badge sensor are related to the cumulative exposure for a single time period. One cannot, however, determine from a single film badge, how the cumulative dosage was accumulated over time. A separate film badge would be required for each time interval, and a separate analysis would be required for each badge.

A single, highly sensitive dosimeter that provides a record of how a dosage is accumulated over an extended time period remains desirable. Therefore, an object of the present invention is to provide a highly sensitive dosimeter that shows how a dosage is accumulated over an extended period of time.

Another object of the present invention is a dosimeter that provides the cumulative dosage of ionizing radiation for an extended time period, dosages for time intervals during that time period, and the radiation profile for the dosage obtained during each interval.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

In accordance with the objects and purposes of the present invention, as embodied and broadly described herein, the present invention includes a temporal dosimeter. The dosimeter includes a sensor for recording dosages of ionizing radiation. The dosimeter also includes means for shielding the sensor from visible light. The shielding means shields a major portion of the sensor from ionizing radiation while unveiling a minor portion of the sensor to ionizing radiation. The shielding means includes multiple apertures, each aperture being selectively permeable to a different type, or types, of ionizing radiation. The dosimeter also includes means for changing the relative position of the sensor and the radiation shield to unveil previously shielded minor portions of the sensor while shielding the remaining major portion of the sensor.

The invention also includes a temporal dosimeter having a sensor for recording dosages of ionizing radiation. The sensor has a first side and a second side. The dosimeter also includes a rotatable, first radiation shield having a shield portion for shielding a major portion of the first side of the sensor from ionizing radiation, and an aperture portion for unveiling a minor portion of the sensor to ionizing radiation. The dosimeter also includes a rotatable, second radiation shield having a plurality of apertures configured such that the rotatable first shield and the rotatable second shield together produce a compound aperture for unveiling different portions of the sensor. The dosimeter also includes a third radiation shield for shielding the second side of the sensor from ionizing radiation. The dosimeter also includes a drive mechanism having a rotatable shaft. The shaft is coupled to the rotatable first radiation shield and to the rotatable second radiation shield to rotate these shields. The dosimeter also includes a power source for driving the drive mechanism. The dosimeter also includes a housing for enclosing the sensor and the shield. The housing is opaque to visible light but transparent to at least one type of ionizing radiation.

The invention also includes a temporal dosimeter having a sensor for recording dosages of ionizing radiation. The dosimeter includes a radiation shield having a shield portion and an aperture portion, the shield portion being opaque to visible light and to ionizing radiation, the aperture portion being opaque to visible light but transparent to at least one form of ionizing radiation. The dosimeter also includes a drive mechanism that includes a linear actuator. The linear actuator is coupled to the sensor and moves the sensor past the aperture portion of the radiation shield so that the sensor turns as it moves past the aperture portion. This way, the sensor records a timeline record of exposure to ionizing radiation along a helical path on the sensor. The dosimeter also includes a power source for driving said linear actuator.

Unveiling a minor portion of a sensor to ionizing radiation using multiple apertures, each aperture being selectively permeable to a different type or types of ionizing radiation; then shielding the minor portion from ionizing radiation after a time interval, thereby recording a separate radiation dosage on the first minor portion for each aperture; and repeating the steps of unveiling and shielding for at least one other minor portion of the sensor to produce a timeline record of exposure to ionizing radiation.

BRIEF DESCRIPTION OF THE DRAWINGS

The accompanying drawings, which are incorporated in and form a part of the specification, illustrate the embodiment(s) of the present invention and, together with the description, serve to explain the principles of the invention. In the drawings.

DETAILED DESCRIPTION OF THE INVENTION

Briefly, the present invention includes a temporal radiation dosimeter that provides a record of exposure to ionizing radiation and the timeline of the exposure. During operation, the dosimeter periodically unveils, i.e. unshields, a selected minor portion of an otherwise shielded sensor to ionizing radiation so that the unveiled portion may record a dosage of ionizing radiation. The result is a timeline record of exposure to ionizing radiation. The dosimeter may also provide the cumulative dosage and the radiation profile for a dosage obtained during a chosen time interval. The invention also includes a method of providing a record of exposure to ionizing radiation.

Figure 1A:
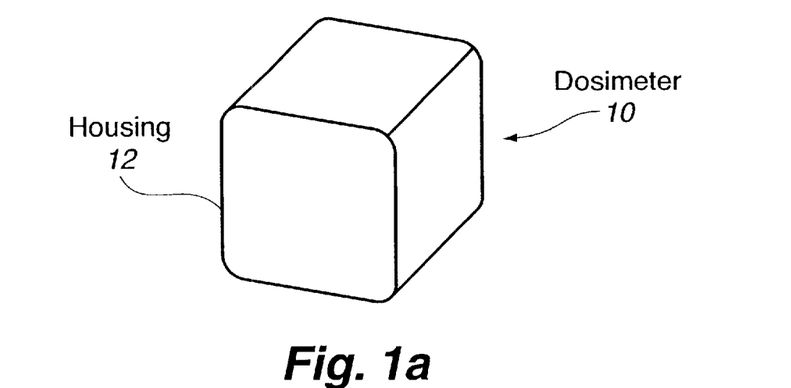
FIGS. 1a–b shows a perspective view and an exploded view of a schematic representation of a dosimeter embodiment of the present invention.
Figure 1B:
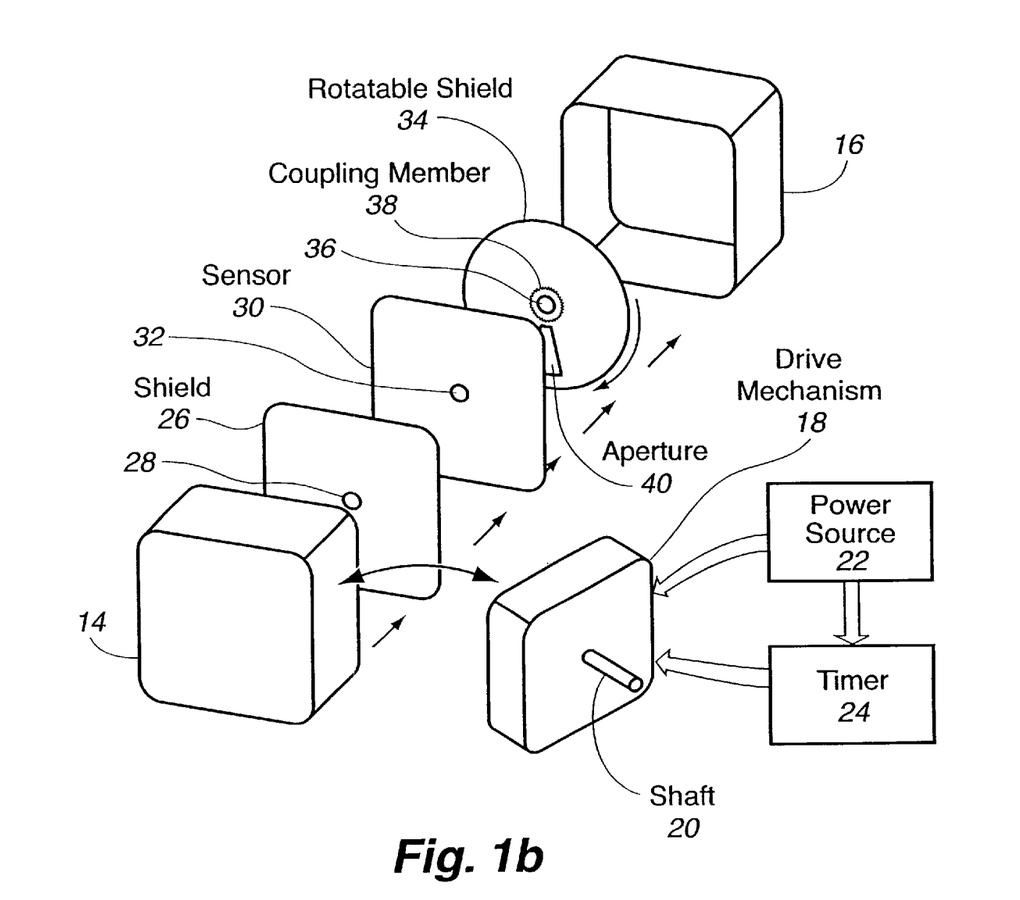

The practice of the invention can be further understood with the accompanying figures. Similar or identical structure is identified using identical callouts. FIG. 1a shows a perspective view of an embodiment of the dosimeter of the invention, and FIG. 1b shows an exploded view thereof. Dosimeter 10 includes housing 12. Housing 12 is opaque to visible light but transparent to at least one form of ionizing radiation. Housing 12 is separable into first housing portion 14 and second housing portion 16. Dosimeter 10 also includes drive mechanism 18 with rotatable shaft 20, both enclosed within housing 12. Dosimeter 10 also includes a power source 22 for driving drive mechanism 18. Power source 22 can be electrical (e.g. alternating current), electrochemical (e.g. a battery), mechanical (e.g. a spring under tension), piezoelectric (e.g. a piezoelectric crystal transducer device), thermoelectric (e.g. a thermopile), photovoltaic (e.g. a photovoltaic cell), or any other power source capable of driving drive mechanism 18. Preferably, power source 22 is a battery. Power source 22, or portions thereof, may be inside or outside housing 12. A mechanical power source, for example, may have a spring portion inside the housing and an outer coupling portion outside the housing for winding the spring. The power source may include tamper-proof features to prevent intrusion and tampering. Dosimeter 10 may include timer 24, which drives, i.e. puts into motion, drive mechanism 18. Timer 24 may be a mechanical timer or an electronic timer. Timer 24 may be programmed to start drive mechanism 18 at the beginning of a scheduled work shift and to stop the mechanism at the end of the work shift. Timer 24 could also be programmed not to drive during non-work days, weekends and holidays, and may be remote controlled to start and stop, e.g. when the dosimeter passes through a factory entrance. Dosimeter 10 also includes a fixed radiation shield 26 having axial through-hole 28 for receiving shaft 20 of drive mechanism 18. For this embodiment, fixed shield 26 is not coupled to shaft 20. Fixed shield 26 is opaque to ionizing radiation. For the embodiment shown in FIG. 1b, housing 12 and fixed shield 26 have a square-like shape, the diameter of fixed shield 26 being slightly smaller than the diameter of housing 12 so that shield 26 assumes a fixed position within housing 12. Dosimeter 10 also includes sensor 30. Sensor 30 records exposure to ionizing radiation. Sensor 30 has axial through-hole 32 for receiving shaft 20 of drive mechanism 18. Dosimeter 10 also includes rotatable radiation shield 34. Rotatable shield 34 has axial through-hole 36 for receiving shaft 20, and attached coupling member 38 for coupling shield 34 to shaft 20. Coupling member 38 may be a gear, a hub, a key, a spline, or the like such that motion of shaft 20 imparts motion to rotatable shield 34. The motion of shaft 20 and rotatable shield 34 could be direct (i.e. one-to one motion) or derived from gearing or sequencing (i.e. other than one-to one). Rotatable shield 34 includes aperture 40, which is transparent to at least one type of ionizing radiation. Except for aperture 40, shield 34 is opaque to ionizing radiation. As shaft 20 rotates, shield 34 also rotates and aperture 40 revolves around shaft 20 and unveils a portion of sensor 30 to ionizing radiation while shielding the remainder of sensor 30. It should be understood that fixed shield 26, housing 12, and sensor 30 need not be square but may adopt other shapes so long as fixed shield 26 and sensor 30 remain stationary relative to rotatable shield 34.

Figure 2A:
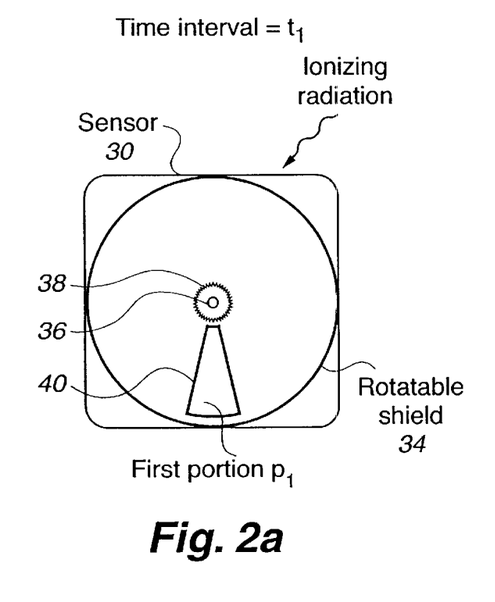
FIGS. 2a–c shows schematic representations of a radiation sensor of FIG. 1 after receiving two dosages of ionizing radiation.
Figure 2B:
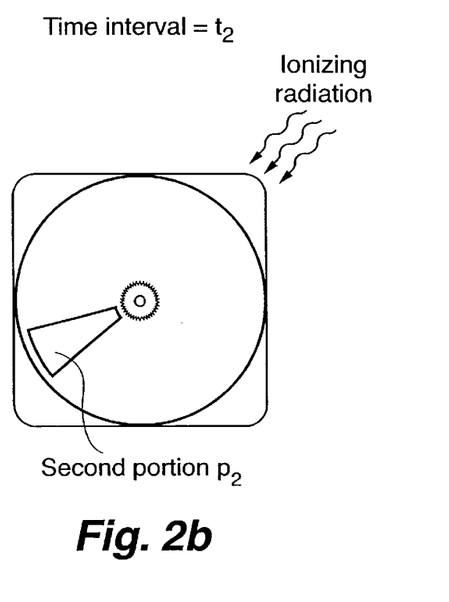
Figure 2C:
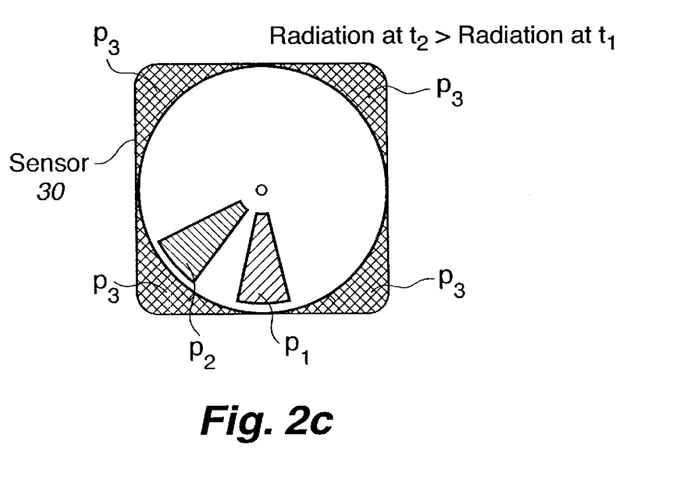

FIGS. 2a–b shows schematic representations of a simple example of exposing two portions of sensor 30 to ionizing radiation. For simplicity, rotatable shield 34 is shown rotating clockwise and in stepwise fashion to expose non-overlapping portions of sensor 30, though neither clockwise nor the exposure of non-overlapping portions of sensor 30 is a requirement of the invention. FIG. 2a shows aperture 40 unveiling first portion $p_1$ of sensor 30 for time interval $t_1$ during which portion $p_1$ records a first dosage of ionizing radiation. At a later time, shield 34 rotates and aperture 40 unveils a second portion $p_2$ of sensor 30 for time interval $t_2$ during which it records a larger, second dosage of ionizing radiation. FIG. 2c shows sensor 30 with dosages recorded at position $p_1$ and position $p_2$. Sensor 30 now provides a timeline record of ionizing radiation dosage.

FIG. 2c shows sensor 30 with a record length of two recorded portions $p_1$ and $p_2$. The practical record length depends, among other things, on the type of sensor. Sensor 30 also provides a record of the cumulative dosage from sensor portion $p_3$, which is never shielded from ionizing radiation. The cumulative dosage recorded by portion $p_3$ may be checked by comparing it to the sum of the dosages recorded for portion $p_1$ and portion $p_2$. Sensors include photographic film (e.g. x-ray film available from Kodak™ or Fuji™), thermoluminescent material (e.g. lithium fluoride), semiconductor material (e.g. germanium), optically stimulated luminescent material (e.g. carbon-doped aluminum oxide), and the like. The record length also depends on the area of the sensor and on the size of the aperture. Aperture 40 should, in any case, unveil a portion of sensor 30 sufficient to provide a record from which the dosage of ionizing radiation may be determined.

Figure 3:
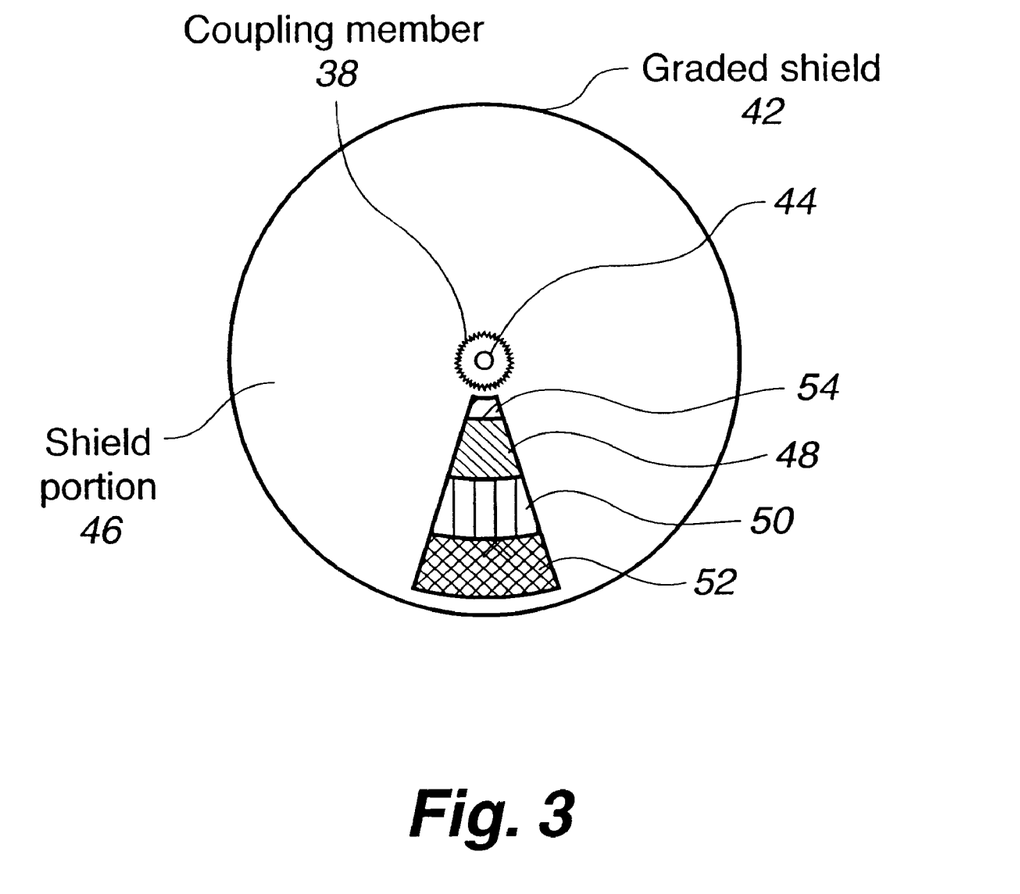
FIG. 3 shows a schematic representation of an embodiment of a graded shield with multiple apertures.

In addition to providing the timeline for dosage and the total dosage, the dosimeter of the invention may also provide the radiation profile for each recorded time interval. The radiation profile describes the types of ionizing radiation (e.g. alpha radiation, beta radiation) and their amounts that contribute to the cumulative recorded dosage for each recorded time interval. FIG. 3 shows a representation of graded shield 42, which may be used in place of shield 34 of FIG. 1 to provide a radiation profile. Graded shield 42 includes axial through hole 44 for receiving shaft 20 of drive mechanism 18, and includes coupling member 38 for coupling graded shield 42 to shaft 20 as described previously for shield 34. Graded shield 42 includes shield portion 46 made from, for example, lead, which is opaque to ionizing radiation, and aperture portions, 48, 50, 52, and 54. Four aperture portions were chosen for illustration purposes only. A number fewer than four or greater than four may also be used. Each aperture portion is selectively permeable to a different type or types of ionizing radiation. Aperture portion 48 may, for example, be thin plastic that transmits beta-radiation. Aperture portion 50 may be elemental aluminum, which absorbs alpha radiation and beta radiation but transmits higher energy ionizing radiation. Aperture portions 52 and 54 can be other materials. Aperture portions may have the same thickness, or may differ in thickness. Clearly, there are many possible ways for providing a graded shield so that the energy profile for each recorded time interval may be known.

The dosimeter embodiment shown in FIG. 1 includes a single rotating shield 34, which provides an unambiguous time record for up to a single revolution of rotatable shield 34. Additional revolutions do not extend the record, but instead destroy the record by overwriting the recorded portions with additional dosages. The record may, on the other hand, be extended by incorporating multiple rotating shields that in combination provide a compound aperture of a reduced size that can be used to increase the number of distinct portions of sensor 30 that can be used to record dosages. The compound aperture is the effective aperture produced by the partial overlapping of apertures from two or more shields. Multiple apertures may be configured and combined in many ways to provide a compound aperture.

Figure 4:
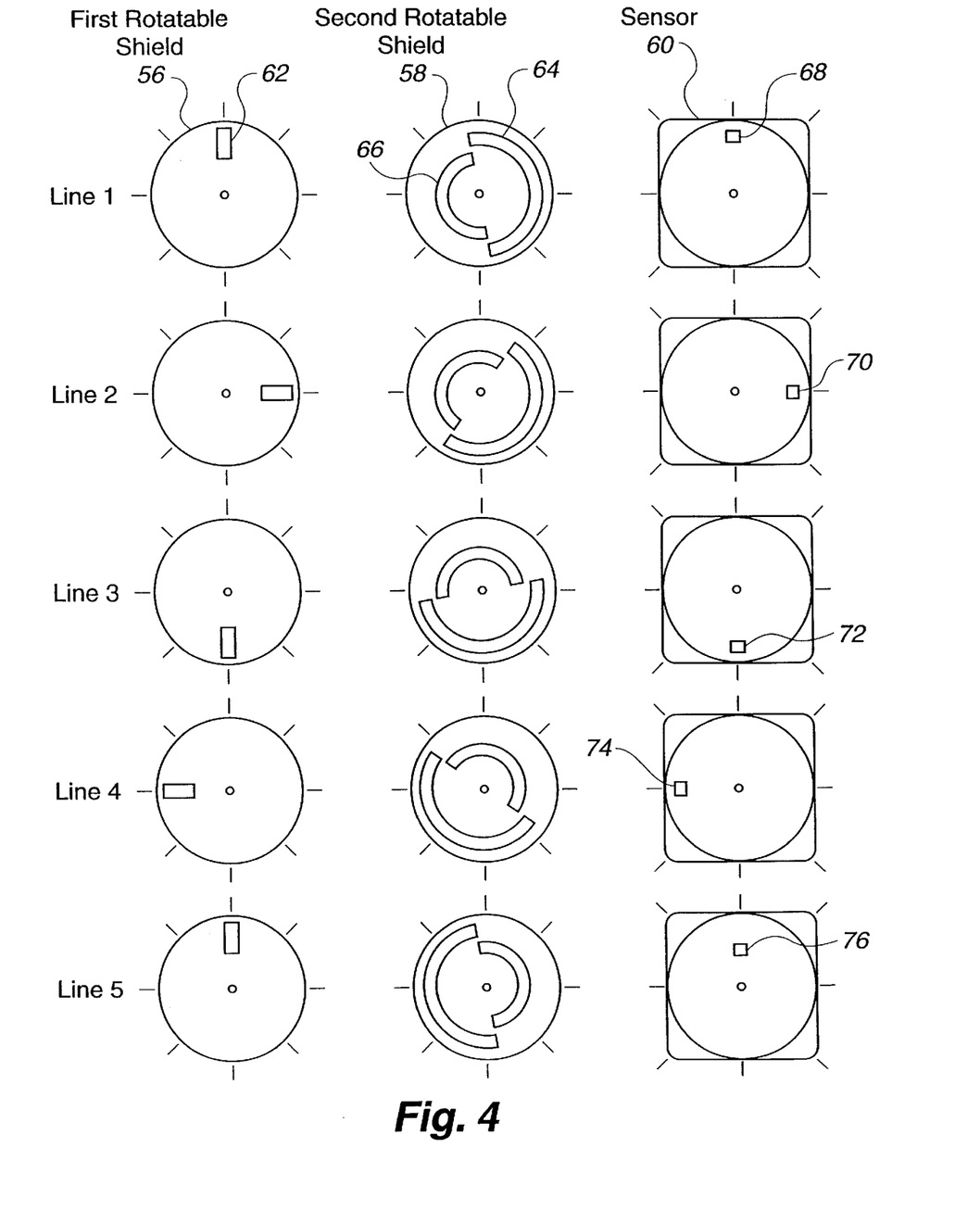
FIG. 4 shows the formation of a compound aperture sequentially unveiling and shielding portions of a sensor.

FIG. 4 illustrates an example of how a compound aperture forms with two rotating shields. The top line, line 1, of FIG. 4 shows first rotable shield 56 on the left, second rotatable shield 58 in the center, and sensor 60 on the right. First rotatable shield 56 has a single rectangular shaped radial aperture 62. Second rotatable shield 58 includes first arc-shaped aperture 64 and second arc-shaped aperture 66. First arc-shaped aperture 64 lies nearer the outer edge of shield 58, second arc-shaped aperture 66 lies nearer to the center of shield 58, and each arc-shaped aperture occupies a single non-overlapping semicircular portion of shield 58. The width of each arc-shaped aperture is less than one half the length of radial aperture 62 of first rotatable shield 56. Sensor 60 on the right shows unveiled portion 68 formed by the overlap of first rotatable shield 56 and second rotatable shield 58. First rotatable shield 56 and second rotatable shield 58 are geared such that first rotatable shield 56 turns at twice the rate of second rotatable shield 58. The second line of FIG. 4 shows first rotatable shield 56 after rotating ¼ turn, second rotating shield 58 after ⅛ turn, and sensor 60 with the next unveiled portion 70. The third line shows first rotatable shield 56 after rotating ½ turn, the second shield 58 after rotating ¼ turn, and the sensor 60 shows the corresponding unveiled portion 72. The fourth line shows first rotating shield 56 after rotating ¾ turn, second rotating shield 58 after rotating ⅜ turn, and sensor 60 with the corresponding unveiled portion 74. The fifth line shows first rotating shield 56 after performing one full turn, the second rotating shield 58 after rotating ½ turn, and the sensor 60 with the corresponding unveiled portion 76. As lines 1–4 show, as the first rotatable shield 56 undergoes its first turn, the compound aperture is formed by the overlap of aperture 62 of first rotating shield 56 and the first arc-shaped aperture 64 of the second rotating shield 58. As the fifth line shows, as the first rotating shield 56 begins a second turn, the compound aperture is now formed by the overlap of aperture 62 of first rotatable shield 56 and the second arc-shaped aperture 66 of the second rotating shield 58.

In the above example, second rotatable shield 58 includes two arc-shaped apertures. It should be understood that multi-aperture shields having more than two apertures may also be used to form a compound aperture with first rotating shield 56. As the number of apertures of the multi-aperture shield increases, the pattern of unveiled portions of sensor 60 approximates a spiral pattern. A rotating shield having a spiral shaped aperture can also be used with first rotatable shield 56 to produce a compound aperture.

Figure 5:
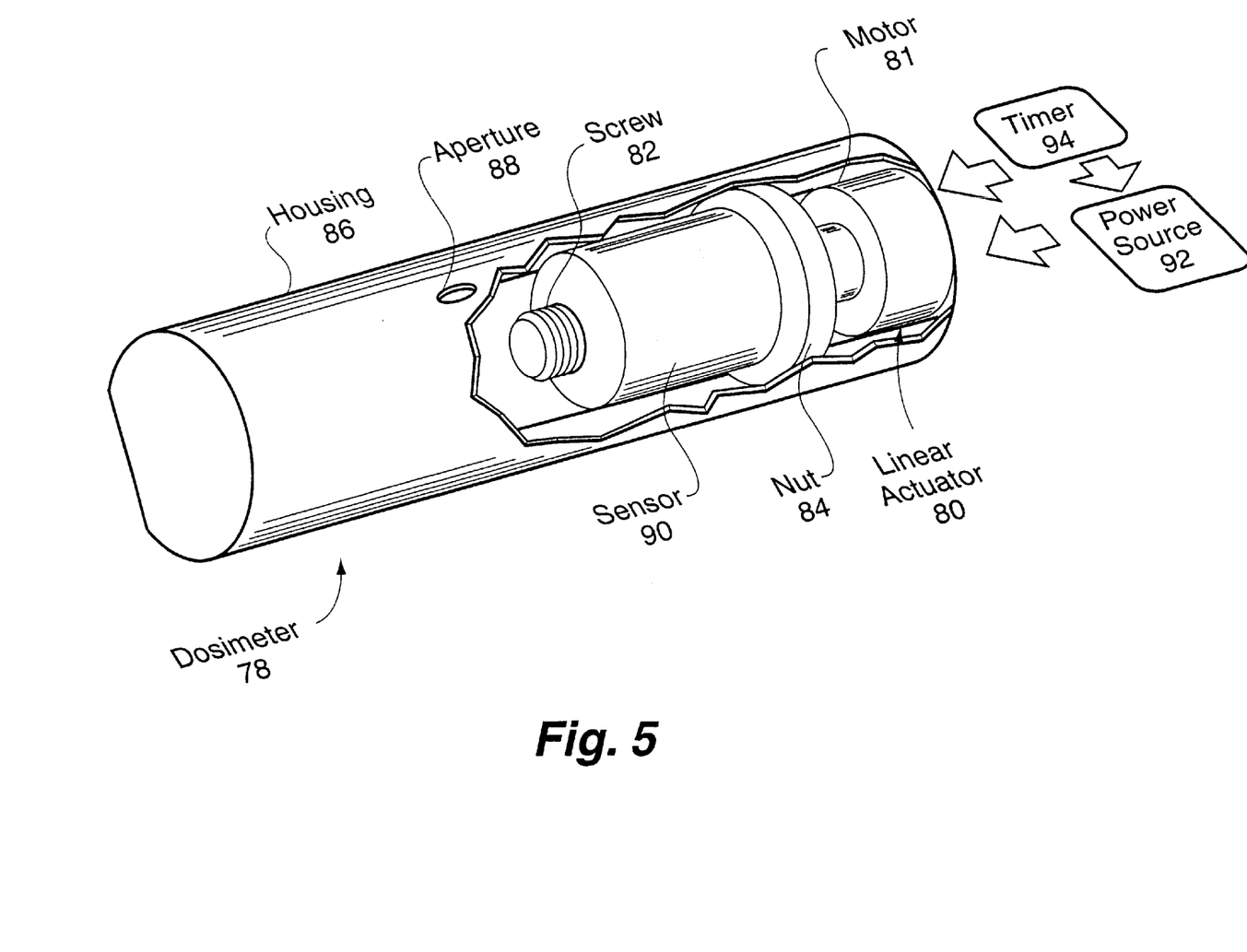
FIG. 5 shows a perspective view of a dosimeter embodiment of the invention that includes a linear actuator.

FIG. 5 shows a cutaway perspective view of another embodiment of the invention. FIG. 5 shows dosimeter 78. Dosimeter 78 includes a linear actuator 80. Linear actuator 80 includes motor 81, screw 82, nut 84 threadably engaged to screw 82, and elongated housing 86. Housing 86 is at most twice as long as screw 82. Housing 86, preferably, has a non-circular inner cross section that is complementary to the outer cross section of nut 84 so that nut 84 moves transversely along screw 82 without rotating. Housing 86 includes aperture 88. Housing 86 is opaque to both visible light and ionizing radiation, while aperture 88 is opaque to visible light but transparent to at least one form of ionizing radiation. Dosimeter 78 includes sensor 90. Sensor 90 is coupled to nut 84 such that as nut 84 transverses screw 82, sensor 90 moves past aperture 88 to expose portions of sensor 90 to ionizing radiation passing through aperture 88.

Preferably, dosimeter 78 includes power source 92 for driving linear actuator 80, and timer 94. Timer 94 may be a mechanical timer or an electronic timer. Timer 94 may programmable to activate linear actuator 80 at the beginning of a scheduled work shift and deactivate it at the end of the work shift. Timer 94 could also be programmed with information relating to non-work days, weekends and holidays, and may be remote controlled to start and stop, e.g. when the dosimeter passes through a factory entrance.

Figure 6A:
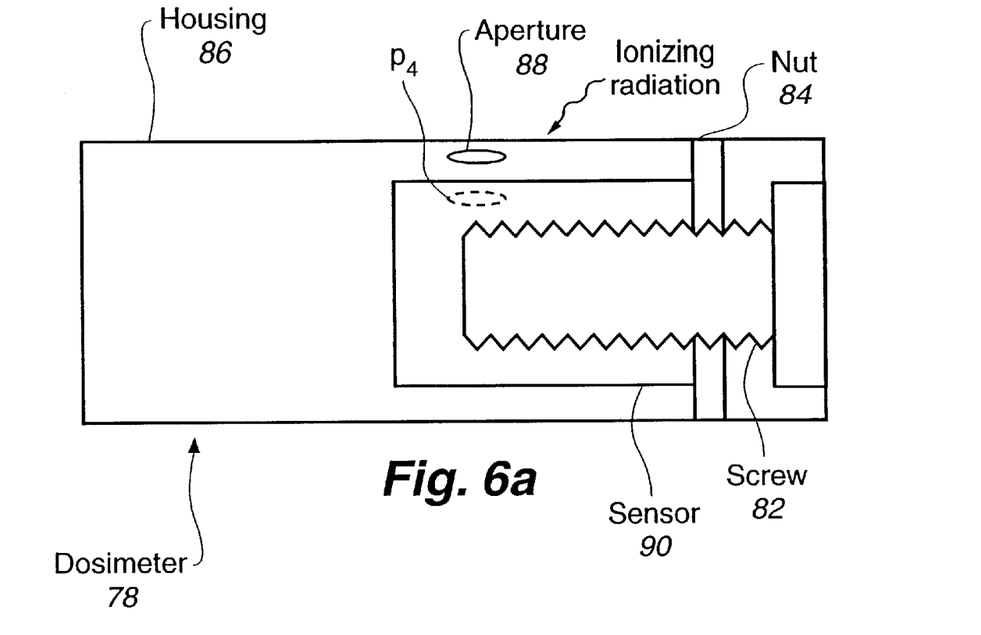
FIGS. 6a–b shows the dosimeter embodiment of FIG. 5 during operation.
Figure 6B:
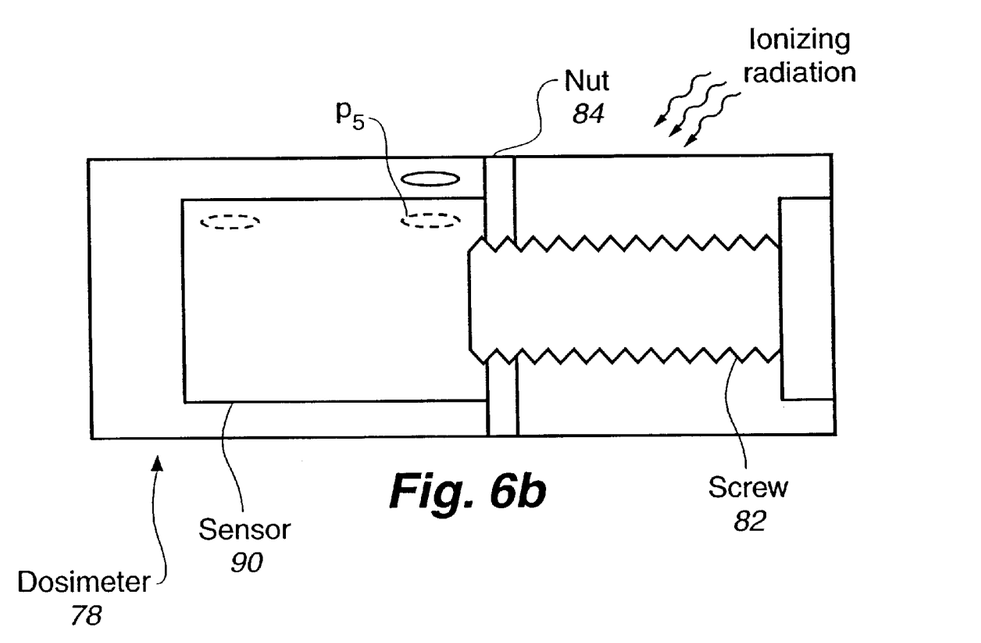
Figure 7:
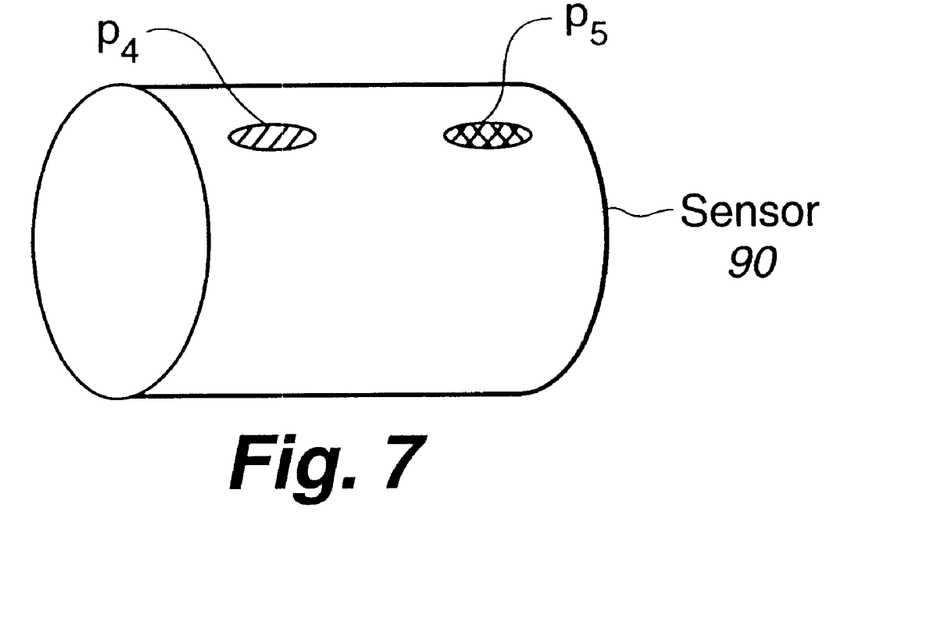
FIG. 7 shows the sensor of FIG. 6a–b after exposure to two dosages of ionizing radiation.

FIGS. 6a–b show cutaway views of dosimeter 78 during operation. FIG. 6a shows dosimeter 78 receiving a first radiation dosage. FIG. 6b shows dosimeter 78 after nut 84 has advanced down the length of screw 82 and sensor 90 receives a second dosage of ionizing radiation, a higher dosage than the first dosage. FIG. 7 shows sensor 90 with a timeline record of the dosages at position $p_4$ and position $p_5$.

Sensor 90 may be rotated as it moves along screw 82 by, for example, providing a surface protrusion to sensor 90 and a helical channel for the protrusion along the inner surface of housing 86. In this configuration, as the nut moves transversely along the screw, the sensor traces a helical path and the aperture exposes portions of the sensor in a helical pattern.

It should be understood that other configurations are possible that increase the record length of the dosimeter 78. Housing 86, for example, may include a channel lengthwise along its inner surface with a hairpin turn that will allow additional portions of the sensor 90 to pass by aperture 88.

Figure 8A:
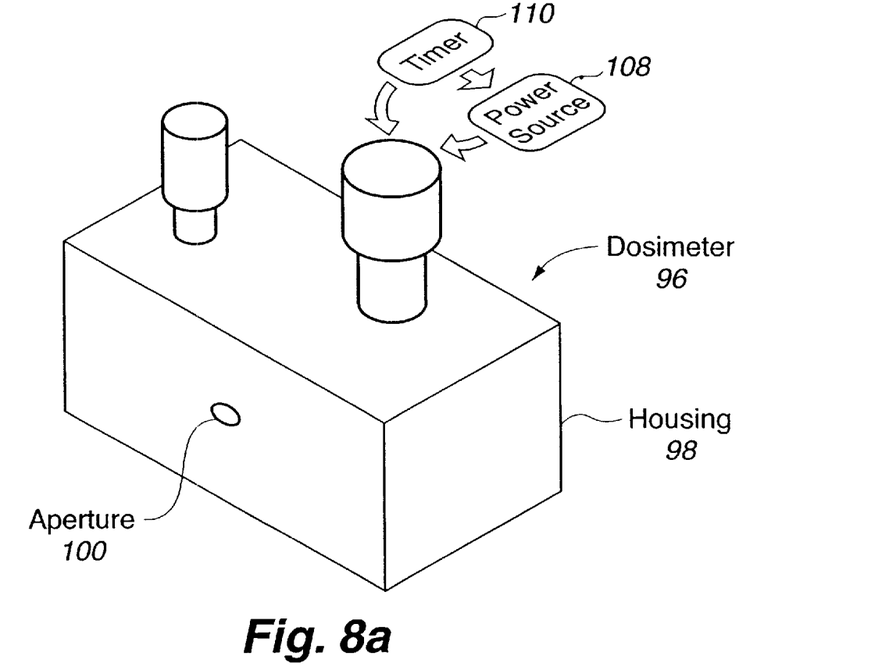
FIGS. 8a–b show views of a dosimeter embodiment that includes reels for winding and unwinding a sensor.
Figure 8B:
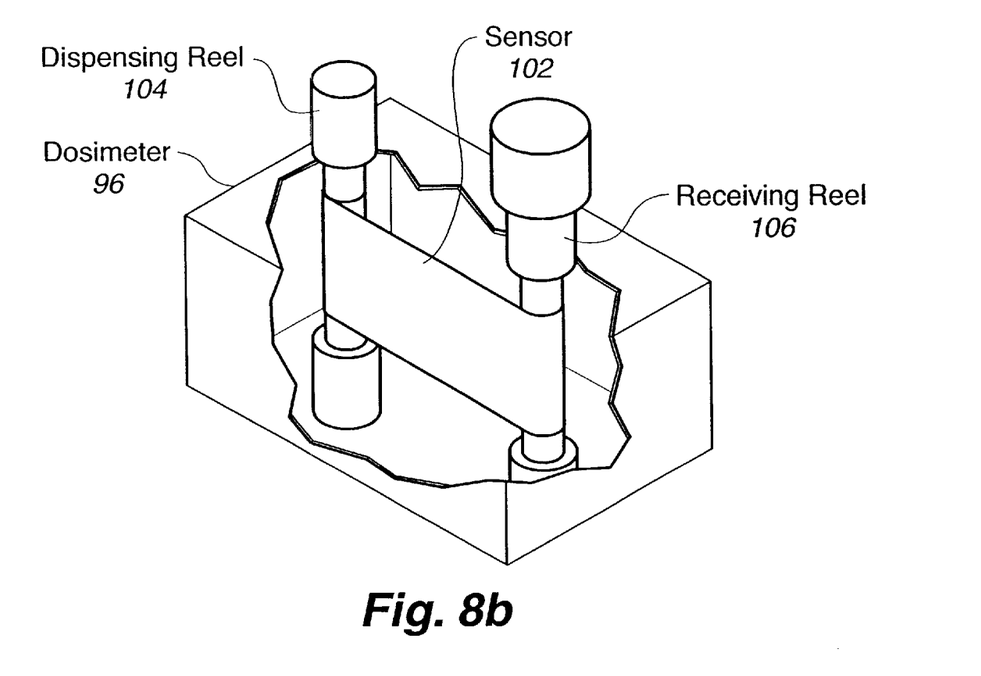

FIG. 8a shows a perspective view of another dosimeter embodiment of the invention, and FIG. 8b shows a cutaway view thereof. Dosimeter 96 includes housing 98, which is opaque to both visible light and ionizing radiation. Housing 98 includes aperture 100, which is opaque to visible light but transparent to at least one form of ionizing radiation. Dosimeter 96 includes sensor 102, preferably in the form of a windable tape or thread. Sensor 102 is wound on rotatable dispensing reel 104, and unwinds during operation to rotatable receiving reel 106. Preferably, dosimeter 96 includes power source 108 and timer 110, which function substantially as previously described for alternate embodiments of the invention.

The foregoing description of the invention has been presented for purposes of illustration and description and is not intended to be exhaustive or to limit the invention to the precise form disclosed, and obviously many modifications and variations are possible in light of the above teaching.

The embodiment(s) were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A temporal dosimeter, comprising in combination:
   (a) a sensor for recording dosages of ionizing radiation, said sensor comprising a first side and a second side;
   (b) a rotatable first radiation shield comprising a shield portion for shielding a major portion of said first side of said sensor from ionizing radiation and at least one aperture portion for unveiling a minor portion of said sensor to ionizing radiation;
   (c) a rotatable second radiation shield comprising a plurality of apertures configured such that said first rotatable shield and said second rotatable shield together produce a compound aperture for unveiling different portions of said sensor;
   (d) a third radiation shield for shielding said second side of said sensor;
   (e) a drive mechanism comprising a rotatable shaft, said shaft being coupled to said rotatable first shield and to said rotatable second shield for rotating said rotatable first shield and said rotatable second shield;
   (f) a power source for driving said drive mechanism; and
   (g) a housing for enclosing said sensor, said rotatable first shield and said rotatable second shield, said housing being opaque to visible light but transparent to ionizing radiation.

2. The temporal dosimeter of claim 1, wherein said drive mechanism comprises an electric motor.

3. The temporal dosimeter of claim 1, wherein said sensor comprises thermoluminescent material, optically stimulated luminescent material, semiconductor material, or photographic material.

4. The temporal dosimeter of claim 1, wherein said power source comprises an electrical, electrochemical, mechanical, piezoelectric, or thermoelectric power source.

5. The temporal dosimeter of claim 1, wherein said power source comprises a battery.

6. The temporal dosimeter of claim 1, further comprising a timer for controlling the transmission of power from said power source to said drive mechanism.

7. The temporal dosimeter of claim 1, wherein said rotatable first radiation shield comprises a circular shield.

8. A temporal dosimeter, comprising in combination:
   (a) a sensor for recording dosages of ionizing radiation;
   (b) a radiation shield comprising a shield portion and at least one aperture portion, the shield portion being opaque to visible light and to ionizing radiation, the aperture portion being opaque to visible light but transparent to at least one form of ionizing radiation;
   (c) a drive mechanism comprising a linear actuator, said linear actuator coupled to said sensor for moving said sensor past said aperture portion of said radiation shield so that the sensor records a timeline record of exposure to ionizing radiation;
   (d) means for coupling said sensor to said radiation shield such that said sensor turns as it moves past said aperture portion, whereby the timeline record of exposure to ionizing radiation is traced along a helical path on said sensor; and
   (e) a power source for driving said linear actuator.

9. The temporal dosimeter of claim 8, wherein said sensor comprises thermoluminescent material, optically stimulated luminescent material, semiconductor material, or photographic material.

10. The temporal dosimeter of claim 8, wherein said power source comprises an electrical, electrochemical, mechanical, piezoelectric, or thermoelectric power source.

11. The temporal dosimeter of claim 8, further comprising a timer for controlling the transmission of power from said power source to said drive mechanism.

\* \* \* \* \*